United States Patent Office 3,369,039
Patented Feb. 13, 1968

3,369,039
PROCESS FOR THE PRODUCTION OF SILICON-CONTAINING TRIOXANE COPOLYMERS
Wolfgang von der Emden and Kuno Wagner, Leverkusen, Hans Niederprum, Monheim, and Walter Simmler, Cologne, Mulheim, Germany, assignors to Farbenfabriken Bayer Aktiengesellschaft, Leverkusen, Germany, a corporation of Germany
No Drawing. Filed Feb. 3, 1966, Ser. No. 524,844
Claims priority, application Germany, Apr. 15, 1965, F 45,832
12 Claims. (Cl. 260—465)

ABSTRACT OF THE DISCLOSURE

Copolymerized trioxane and formals or carbonic acid esters of bis-(hydroxyalkyl) silicon compounds which may be prepared at temperatures between 50 and 120° C. in the presence of a cationic initiator.

---

Processes are known by which trioxane, the cyclic trimer of formaldehyde, can be converted into linear polyoxymethylenes of high molecular weight. The homopolymers of trioxane are easily and quantitatively decomposed to monomeric formaldehyde upon heating or under the action of catalytic quantities of acids or caustic solutions.

The stability of polyoxymethylenes can be improved by etherifying or esterifying the terminal groups. However, it is difficult to carry out a complete reaction of the terminal groups, because no solvent is known which dissolves polyoxymethylenes at low temperatures; and the thermal and acidly catalysed decomposition commences at higher temperature, especially when etherification is carried out.

Polyoxymethylenes with stabilised terminal groups are more easily obtained by copolymerisation of trioxane with cyclic compounds, which cause the chains not to consist only of formaldehyde units, but also to comprise ether units therebetween. If the incorporation of the co-monomer is effected statistically and only a few percent thereof are incorporated, most of the ends of the chain are of semi-acetal nature.

Formaldehyde is split off from such copolymers under the influence of alkali or upon heating, but the decomposition comes to a stop when an ether unit of the co-monomer has become the terminal group.

Epoxides and cyclic formals of aliphatic diols, such as 1,3-dioxolane, tetramethylene diol formal, diethylene glycol formal and triethylene glycol formal, are for example known as co-monomers.

As the copolymers are products containing acetal and ether groups, they are just as susceptible to oxidation as those homopolymers of trioxane or formaldehyde which have closed terminal groups. Also, their thermostability is in the same order of magnitude as the said homopolymers and they are characterised by a thermal degradation of approximately 1% per hour at 220° C.

Phenols, carbonamides, ureas or carbodiimides can be added to the polymers to improve their stability with respect to heat and oxidation. The sensitivity to oxidation is also reduced by polymerising therein sulphur-containing co-monomers, for example 1,3-oxthiolane or 1,3-dioxa-6-thiacyclooctane (thiodiglycol formal). In trioxane-oxthiolane copolymers, it is possible substantially to dispense with oxidation stabilisers; on the contrary, the thermostability is not better than that of the homopolymers and trioxane-ethyleneoxide copolymers.

A process for the production of new trioxane copolymers has now been found, which is characterised in that formals or carbonic acid esters of bis-(hydroxyalkyl) silicon compounds are copolymerised with trioxane at temperatures between 50 and 120° C. in the presence of a cationic initiator. Furthermore, it has been found that these formals or carbonic acid esters of bis-(hydroxyalkyl) silicon compounds can be prepared if bis-(hydroxyalkyl) silicon compounds are reacted in the presence of small quantities of a strong acid with formaldehyde or formaldehyde-yielding substances to the corresponding formal or in the presence of a base with phosgene to the corresponding carbonic acid ester at temperatures between 60 and 200° C.

Suitable bis-(hydroxyalkyl) silicon compounds are those of the general formula

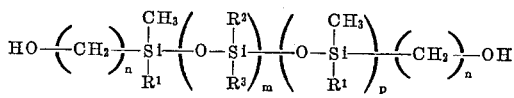

wherein $n$ represents 1, 3 or 4, $m$ represents 0, 1, 2, 3 or 4 and $p$ represents 0 or 1, and
$R^1$ represents —$CH_3$, —O—Si($CH_3$)$_3$, or

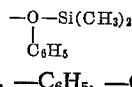

$R^2$ represents —$CH_3$, —$C_6H_5$, —O—Si($CH_3$)$_3$,

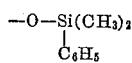

and
$R^3$ represents —$CH_3$, —$C_6H_5$, —O—Si($CH_3$)$_3$ or

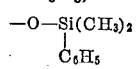

Examples of such compounds are:
Bis-[hydroxymethyl]-dimethyl silane

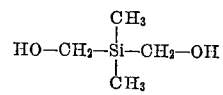

1,3-bis-[hydroxymethyl]-tetramethyl disiloxane

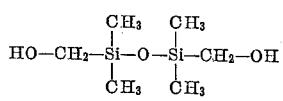

1,3-bis[hydroxybutyl]-tetramethyl disiloxane

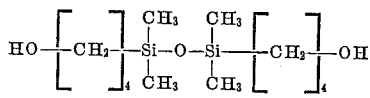

1,3 - bis[hydroxymethyl] - 1,3 - bis - [dimethylphenylsiloxy] 1,3-dimethyl disiloxane

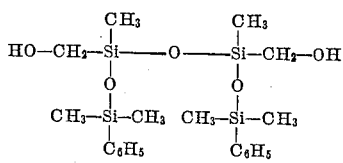

as well as polysiloxanes of higher molecular weight which comprise hydroxyl groups in the terminal groups or side chains.

The formals and carbonic acid esters which are produced according to the invention and which are hereinafter referred to as sila-formals or sila-esters are cyclic compounds in the case of organosilicon components of low molecular weight, it being easily possible to isolate rings with 6, 8 and 10 members, for example 1,1-dimethyl-1-sila-3,5-dioxane

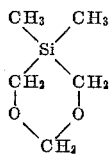

2,2,8,8-tetramethyl-2,8-disila-1,4,6-trioxa cyclooctane

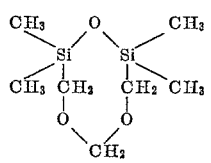

2,2,8,8 - tetramethyl - 5-oxo-2,8-disila-1,4,6-trioxa-cyclooctane

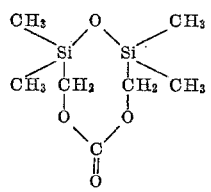

1,1,3,3,9,9 - hexamethyl - 1,3,9 - trisila - 2,5,7,10-tetraoxa-cyclodecane

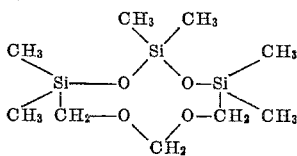

and 2,8 - bis - [dimethylphenylsiloxy]-2,8-dimethyl-2,8-disila-1,4,6-trioxa cyclooctane

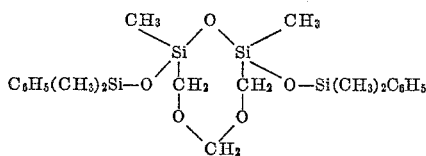

In view of the known sensitivity of trioxane polymerisation reactions towards impurities, attention has to be paid to high purity of the other components, particularly in the case of copolymerisation reactions.

Pure copolymerisable sila-formals are obtained according to the invention by the following process: bis-(hydroxyalkyl)-silicon compounds are treated with formaldehyde or formaldehyde-yielding substances (such as paraformaldehyde or formals of low-boiling alcohols) in the presence of catalysts, e.g. small quantities (about 0.1 to 5% by weight) of strong acid, (e.g. 0.5 to 2% of p-toluosulphonic acid or sulphuric acid) with moderate heating (to temperatures between about 30 and 200° C.), the water which forms being removed by azeotropic distillation with an inert, water-immiscible solvent such as benzene or toluene or, in the case of re-acetalisation, the volatile alcohol formed is distilled off.

The corresponding carbonic acid esters are obtained in similar manner by reaction with phosgene.

The process according to the invention is hereinafter described in detail, taking as example the compound 2,2,8,8 - tetramethyl - 2,8 - disila - 1,4,6-trioxa-cyclooctane which is excellently suitable for the copolymerisation:

To pure 1,3-bis-(hydroxymethyl)-tetramethyl disiloxane, obtained for example according to British patent specification No. 980,778, there is added at least the molar quantity of paraformaldehyde 0.5% of p-toluosulphonic acid and a small quantity of benzene, and the mixture is heated to boiling. The water which forms is distilled off azeotropically with the benzene at a sump temperature of about 90° C.

After complete removal of the solvent, the remaining residue, which consists only partially of the cyclic formal but for the major part of linear polyacetals, undergoes a distillation under reduced pressure (about 15 mm. Hg), an efficient column being used. After distilling off the primarily formed heterocyclic substance, the distillation residue is gradually heated up to about 200° C. The polyacetal is pyrolised in this way, and is transformed into the cyclic monomer under the catalytic influence of the acid still present from the production stage. The cyclic monomer is constantly distilled off. The entire distillate is thereafter again subjected to a fractionated vacuum distillation, the cyclic formal being obtained in a high degree of purity.

A large number of the sila-compounds used according to the invention are compounds of the following general formula.

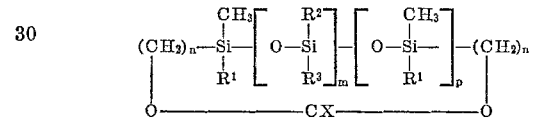

wherein $X=H_2$ or O, advantageously $H_2$, and $R^1$, $R^2$, $R^3$, $m$, $n$, and $p$ have the meaning indicated above.

It is surprising that less pure 1,3-bis-(hydroxymethyl)-tetramethyl disiloxane, which contains considerable proportions of halomethyl, acetoxy ethyl and trisiloxane groups from the production stage, can be converted in a good yield into pure copolymerisable formal. Obviously, it is not only the acetal bond but also the siloxane bond which is opened by the acid catalyst. The formal then forming in statistical equilibrium is constantly distilled off, while the non-functional terminal groups are concentrated in the pyrolysis residue. By further fractionated vacuum distillation, it is also possible to isolate from the pyrolysis residue a small quantity of a copolymerisable formal which boils at a higher temperature, namely the formal of 1,5-bis-(hydroxymethyl)-hexamethyl trisiloxane.

It is furthermore surprising that 6-membered dioxane derivatives are only formed to a completely subordinate degree, although it is known from the literature that these cyclic ethers are formed by dehydration from bis-(hydroxymethyl)-tetramethyl disiloxane under the influence of catalysts or agents splitting off water.

A copolymerisable sila-carbonic acid ester is obtained according to the invention by the following process, which is described in detail, taking as example polymeric 2,2,8,8-tetramethyl-5-oxo-2,8-disila-1,4,6-trioxa-cyclooctane:

Pure 1,3 - bis - hydroxymethyl-tetramethyl-disiloxane is mixed with at least four times the equimolar quantity of a tertiary amine, and a slow stream of phosgene is introduced while stirring. The exothermic reaction is prevented from reaching temperatures higher than 60° C., since side reactions then occur which lead to impurities.

The excess amine also serves for this purpose, since it has been found in the course of this operation that hydrogen chloride has a substituting action on the starting material, products with chloromethyl groups on the silicon being formed. The introduction of gas is terminated as soon as the waste gases escaping from the reaction vessel have a strong phosgene content. The substance is filtered, washed with tertiary amine and heated for 2 hours under reflux. Residual amounts of semi-ester are then converted into diester. Thereafter, the solvent is removed by heating and the carbonic acid ester is obtained as residue.

If polymeric hydroxalkyl silicon compounds are used as co-monomers, a similar procedure has to be followed, except that a heating in the stream of nitrogen at 80° C./15 mm. Hg takes the place of the fractionated distillation.

The copolymerisation of trioxane with the sila-formals or sila-carbonic acid esters or their polymers is initiated by cationic initiators. The sila-formals are advantageously used for the copolymerisation. As such, it is possible to use strong acids, such as sulphuric acid, perchloric acid, alkane-sulphonic acids and p-toluosulphonic acid, and also so-called Lewis acids, such as boron trifluoride, boron trichloride, aluminium chloride, ferric chloride, antimony pentachloride, titanium tetrachloride and tin tetrachloride, or addition compounds of boron trihalides, more especially of boron fluoride, with ethers, carboxylic acid esters, carboxylic anhydrides, nitriles and carboxylic amides, as well as oxonium and carboxonium salts, such as triethyl oxonium fluoborate and 2-methyl dioxolenium fluoborate. Fluoborates of aryl diazonium compounds, which are converted at high temperature into aryl cations with nitrogen being split off, are likewise suitable.

The initiators are added to the mixture in quantities of from 0.001 to 1% by weight, based on the combined weight of trioxane and formal.

The copolymerisation can be carried out as block polymerisation, which takes place within a short time and with almost quantitative yield. For this purpose, the catalyst is melted with the trioxane and the co-monomer is added simultaneously, or the trioxane is melted initially with the co-monomer and then the catalyst is added, possibly in an inert solvent. However, the polymerisation can also be effected in suspension in an organic liquid, in which trioxane has only limited solubility. Suitable for such a form of the process are for example straight-chain aliphatic hydrocarbons with more than 8 carbon atoms, or mixtures thereof, for example a $C_{12}$–$C_{18}$ fraction of boiling point range 230 to 320° C.

If the polymerisation is carried out as a solution polymerisation, then the following solvents can for example be used: benzene, toluene, hexane, heptane, cyclohexane, isooctane, white spirit, hydrogenated trimeric isobutylene and chlorinated hydrocarbons.

In general, the polymerisation according to the invention is carried out at temperatures of from 50 to 120° C., advantageously at 70 to 110° C. It is often possible with advantage to work at about 70 to 85° C. In particular cases, it is possible to exceed or not reach the indicated temperature range.

The copolymers are initially still unstable. The acid catalyst and a certain proportion of loosely combined formaldehyde must be removed. For this purpose, the crude polymer must be treated for a relatively long time in suspension in aqueous or alcoholic solution of an inorganic or organic base. It is advantageous to use 5 to 10% of aqueous caustic soda solution in a 10-times excess, based on the copolymer, at 90 to 100° C. It is surprising that this procedure, which leads with copolymers of trioxane and for example ethylene oxide to the formation of stable products, can also be used here, and thus a co-monomer having no —C—C— grouping supplies stable terminal groups. It was not to be expected that the —O—CH$_2$—Si—O grouping, after incorporation into the polyoxymethylene chain, would be stable with respect to boiling sodium hydroxide solution.

After the sodium hydroxide treatment, the loosely combined formaldehyde is generally completely decomposed. If required, the material can also be heated for a short time (up to 15 minutes) under vacuum to above the melting point (to 160 to 220° C.). A material is then obtained which, under a thermostability measurement at 222° C. under nitrogen, loses hourly less than 1% by weight. Examination by differential thermo-analysis shows the commencement of the decomposition under nitrogen at 300° C. and the decomposition maximum at 320° C., that is to say, 30° C. to 50° C. higher than with trioxaneethylene oxide polymers.

Depending on the intended purpose of use, copolymers of different molecular weight range and different content of co-monomers can be produced. For use as thermoplastic material in the manufacture of moulded elements by the injection moulding process or fibres by the melt-spinning process, copolymers of high molecular weight are suitable, of which the reduced viscosity is in the range from about 0.6. to 2.0, measured at 60° C. in 0.5% solution in p-chlorophenol. For the production of such copolymers, the quantity of the silicon-containing co-monomers being used is advantageously 0.5 to 5 mol% based on the trioxane employed. Light stabilisers, dyestuffs, pigments and optionally heat and oxidation stabilisers, fillers or plasticisers can for example be added to these polymers.

If the copolymers are used as intermediate products or auxiliaries in the plastics field, lower molecular weights down to about 500 may also be required. In this case, higher proportions of the silicon-containing co-monomer, up to about 50 mol percent, based on monomeric formaldehyde, can also be used. The copolymers which are obtained can in this case have an oily or resinous consistency at room temperature, the crystallinity of the copolymers increases and the melting point rises with increasing proportion of formaldehyde.

Furthermore, it is possible, by additional use of other co-monomers, for example cationically polymerisable olefines or cyclic compounds, still further to modify the properties of the copolymers. To be mentioned as examples for this purpose are acrylonitrile, ethyl vinyl ether, methyl vinyl sulphone or epoxy compounds (such as ethylene oxide or propylene oxide), cyclic acetals (such as 1, 3-dioxolane) or diethylene glycol formal and triethylene glycol formal, and also nitrogenous organic co-monomers such as bis(alkylsulphonyl)-imidazolidones and alkylsulphonyl oxazolidines and organic silicon co-monomers, such as hexamethyl cyclotrisiloxane and octamethyl cyclotetrasiloxane.

EXAMPLE 1

1.5 kg. of bis-(hydroxymethyl)-tetramethyl disiloxane with a hydroxyl group content of 15.55% (corresponding to 13.7 mols of OH) were heated to boiling with 1 litre of benzene and 7.5 g. of p-toluosulphonic acid and also 214 g. (7.14 mols, 5% excess) of paraformaldehyde. After removal of about 125 ml. of water distilling over azeotropically with benzene, the remaining benzene was distilled off through an efficient column and thereafter the remaining oil was distilled in water jet vacuum, the sump temperature being raised up to about 200° C. The cyclic formal removed at a head temperature of about 50 to 80° C. was fractionated, the main quantity boiling at $B_{p11}$=64°, $n_D^{20}$=1.4338.

Yield: 920 g. (about 65% of the theoretical).

Analysis.—$C_7H_{18}O_3Si_2$: Found: C, 40.3%; H, 8.80%; M, 199. Calculated: C, 40.74%; H, 8.71%; M, 206.4.

EXAMPLE 2

97 g. of 1,3-bis-hydroxymethyl tetramethyl disiloxane are placed with 200 g. of triethylamine and 500 g. of toluene in a 3-necked spherical flask and a moderate stream of phosgene is introduced thereinto while stirring. The temperature is kept below 50° C. by regulating the stream of phosgene and by cooling, until the presence of phosgene becomes apparent in the waste gas. Filtration is carried out and volatile fractions are distilled at atmospheric pressure until the sump temperature is 160° C. The residue is removed by heating in vacuo and there remains a thinly liquid oil having a refractive index of $n_D^{20}$=1.4482, in which the carbonic acid ester grouping can be detected by infra-red spectroscopy.

EXAMPLE 3

To 1 kg. of a linear hydroxymethyl-substituted polysiloxane, with an OH-content of 3.2% (corresponding to 1.88 mols of OH) and the approximate composition $$HO-CH_2-Si(CH_3)_2-O-[Si(CH_3)_2-O]_{12}-SiCH_3)_2-CH_2-OH$$

there were added 1 litre of benzene, 1 g. of p-toluosulphonic acid and 31 g. (1.035 mols, 10% excess) of paraformaldehyde, and the mixture was heated to boiling point. After removing about 16 ml. of water the benzene solution was neutralised with sodium hydrogen carbonate, filtered and then the solvent was removed by distillation. The remaining oil was freed from all volatile fractions at a sump temperature of 80° C. under a nitrogen pressure equivalent to 15 mm. Hg.

880 g. (about 87% of the theoretical) of a yellowish viscous oil were isolated, the oil having the following data:

| | |
|---|---|
| Refractive index $n_D^{20}$ | 1.4139 |
| Density $d_{20}^4$ | 0.98 |
| Viscosity $n^{20}$ centipoise | 280 |
| OH-content percent | 0.2 |

EXAMPLE 4

0.1 ml. of sulphuric acid monohydrate is added at 70° C. to a mixture of 50 g. of trioxane and 2.5 g. of 2,2,8,8-tetramethyl-2,8-disila-1,4,6-trioxane-cyclooctane. The mixture quickly becomes cloudy and subsequently solid and hard. The reaction ended after 30 minutes. The solid block is comminuted and kept under reflux for 10 hours while suspended in 5% sodium hydroxide solution. It is filtered off and washed free from alkali. 32 g. of a polymer are obtained, containing 0.96% of silicon, and at 60° C. has the intrinsic viscosity $n_i=0.567$, measured in 1% solution in p-chlorophenol. At 220° C., there is a loss in weight per hour of 1% under nitrogen. Differential thermo-analysis shows the commencement of the decomposition at 300° C. and the decomposition maximum at 320° C.

EXAMPLE 5

0.04 ml. of boronfluoride diethyl etherate are added at 70° C. to 50 g. of trioxane and 2 g. of 2,2,8,8-tetramethyl-2,8-disila-1,4,6-trioxa-cyclooctane. The mixture immediately reacts completely. The solid block which forms is comminuted and kept under reflux for 10 hours while suspended in 5% sodium hydroxide solution. 35 g. of a polymer are obtained, the polymer having an intrinsic viscosity of 0.625, measured at 60° C. in 1% solution in p-chlorophenol.

EXAMPLE 6

At 70° C., 500 g. of trioxane and 20 g. of 2,2,8,8,-tetramethyl-2,8-disila-1,4,6-trioxa-cyclooctane are emulsified in 500 ml. of heptamethyl nonane and 500 mg. of 2-methyl-1,3-dioxolenium fluoborate are added. The mixture becomes cloudy and in time changes into a suspension. After 3 hours, this is suction filtered, and washed with commercial benzine and acetone. Yield 370 g. If the crude product is held under reflux for 10 hours while suspended in 5% sodium hydroxide solution, there are obtained 234 g. of stable material which shows an hourly loss in weight of 1% at 220° C. and contains 2.06% of Si.

EXAMPLE 7

0.1 ml. of sulphuric acid monohydrate is added to a mixture of 50 g. of trioxane, 5 g. of 2,2,8,8-tetramethyl-2,8-disila-1,4,6-trioxa-cyclooctane and 5 g. of hexamethyl trisiloxane at 70° C. A solid block is formed and this is comminuted, washed with acetone and boiled for 10 hours under reflux while suspended in 5% aqueous sodium hydroxide solution. 29 g. of stable material are obtained with an intrinsic viscosity $n_i=0.813$, measured at 60° C. in 0.5% solution in p-chlorophenol. Loss in weight at 220° C. is 0.7% per hour.

EXAMPLE 8

0.2 ml. of sulphuric acid is added to a mixture of 10 g. of trioxane and 30 g. of 2,2,8,8-tetramethyl-2,8-disila-1,4,6-trioxa-cyclooctane and the mixture is kept for 10 hours at 70° C. Two copolymers are formed, one of which is solid and insoluble in either while the other is liquid and soluble in ether. The amount of solid polymer is 9 g. in the crude state and 7 g. after treatment with sodium hydroxide solution.

EXAMPLE 9

5 g. of the polymeric condensation product of bis-hydroxymethyl-tetramethyl-disiloxane and p-formaldehyde are dissolved in 50 g. of trioxane at 70° C. and 0.1 ml. of sulphuric acid is added. In 30 minutes, a hard solid block is obtained. After treatment with sodium hydroxide solution, as in Example 7, 28 g. of stable product are obtained, this losing 1% by weight per hour at 220° C.

What is claimed is:

1. Process for producing silicon-containing trioxane copolymers which comprises reacting a formal or a carbonic acid ester of a bis-(hydroxyalkyl)-silicon compound with trioxane at temperatures between 50 and 120° C. in the presence of a strongly acidic cationic initiator or a Lewis acid.

2. Process for producing silicon-containing trioxane copolymers according to claim 1 wherein 95 to 99.5 mol percent of trioxane is copolymerized with 0.5 to 5 mol percent of the formal or carbonic ester of said silicon percent the formal or carbonic ester of said silicon compound.

3. Process for producing silicon-containing trioxane copolymers according to claim 1 wherein the formal or carbonic ester has the formula

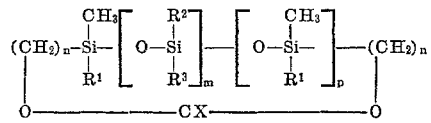

wherein X represents two hydrogen atoms or an oxygen atom, $n$ is 1, 3 and 4, $m$ is 0, 1, 2, 3 and 4, $p$ is 0 and 1, $R^1$ is a member selected from the group consisting of —CH_3, —O—Si(CH_3)_3 and

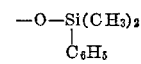

and $R^2$ and $R^3$ are members selected from the group consisting of —CH_3, —C_6H_5, —O—Si(CH_3)_3 and

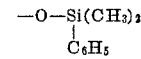

4. Processing according to claim 3 wherein ethylene oxide, 1,3-dioxolane, 1,3-oxithiolane, bis-methanesulfonyl imidazolidines or hexamethyl cyclotrisiloxane are used as further co-monomers.

5. Process according to claim 3 wherein sulfuric acid is used as initiator of the polymerization.

6. Process according to claim 3 wherein boron trifluoride or an adduct of boron trifluoride with diethyl ether, dibutyl ether, glacial acetic acid, phenol or acetonitriles, is used as initiator of the polymerization.

7. Process according to claim 3 wherein 2-methyl-1,3-dioxolenium fluoborate is used as initiator of the polymerization.

8. A copolymer produced by reacting trioxane and a formal or carbonic ester of a bis(hydroxylakyl) silicon compound having the formula:

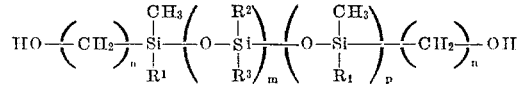

wherein $n$ represents 1, 3 or 4, $m$ represents 0, 1, 2, 3 or 4, $p$ represents 0 or 1, $R^1$ represents —$CH_3$, —O—Si($CH_3$)$_3$ or

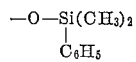

and $R^2$ and $R^3$ represent —$SH_3$, —$C_6H_5$, —O—Si($CH_3$)$_3$ or

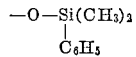

said reaction being carried out at a temperature between 50 and 120° C. in the presence of a cationic initiator.

9. A copolymer of claim 8 wherein the formal or carbonic ester has the formula

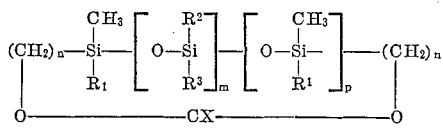

wherein X stands for two hydrogen atoms or an oxygen atom, $n$ is 1, 3 and 4, $m$ is 0, 1, 2, 3 and 4, $p$ is 0 and 1, $R^1$ is a member selected from the group consisting of —$CH_3$, —O—Si($CH_3$)$_3$ and

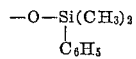

and $R^2$ and $R^3$ are members selected from the group consisting of —$CH_3$, —$C_6H_5$, —O—Si($CH_3$)$_3$ and

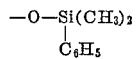

10. A copolymer of claim 8 containing 99.5 to 95.0 mol percent trioxane and 0.5 to 5 mol percent of the formal or carbonic ester of said silicon compound.

11. A copolymer produced by reacting trioxane and 2,2,8,8-tetramethyl-2,8-disila-1,4,6-trioxa-cyclooctane at a temperature between 50 and 120° C. in the presence of a cationic initiator.

12. A process for producing a trioxane-silicon copolymer which comprises reacting trioxane and 2,2,8,8-tetramethyl - 2,8 - disila - 1,4,6 - trioxa-cyclooctane and trioxane at a temperature between 50 and 120° C. in the presence of a cationic initiator.

References Cited

UNITED STATES PATENTS

| 3,146,251 | 8/1964 | Brown et al. | 260—46.5 |
| 3,200,096 | 8/1965 | Hudgin et al. | 260—67 |

FOREIGN PATENTS 980,778  1/1965  Great Britain.

OTHER REFERENCES

Inoue et al., Chemical Abstracts, vol. 62, column 664f (January 1965). Copolymerization of trioxane with octamethylcyclotetra siloxane in the present of $SbC_5$ at 70° C. in an autoclave.

DONALD E. CZAJA, *Primary Examiner.*

M. I. MARQUIS, *Assistant Examiner.*